Figure 1:
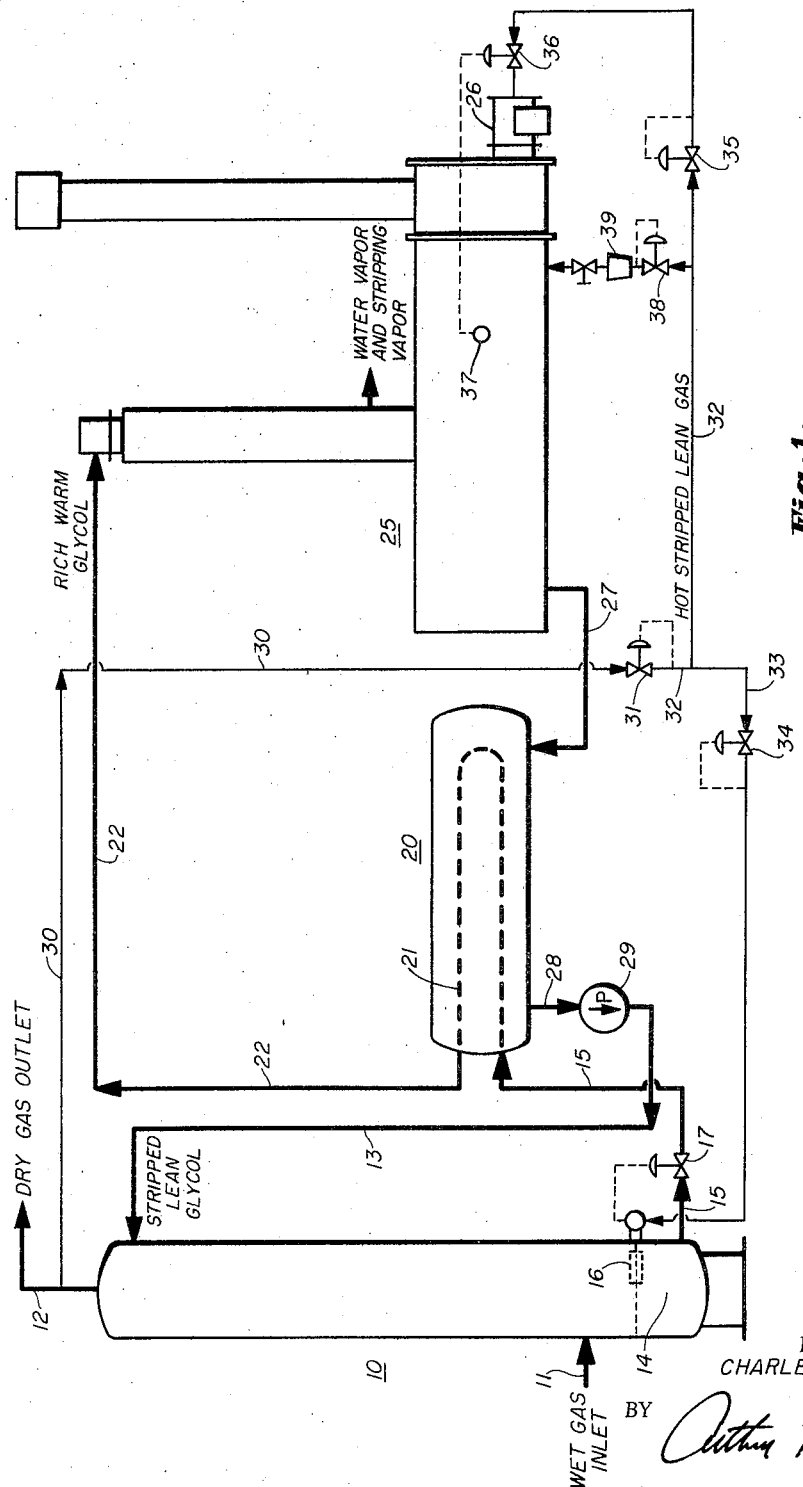

Feb. 8, 1966     C. O. MEYERS     3,233,390
APPARATUS FOR RECONCENTRATING LIQUID DESICCANT
Filed March 11, 1963     2 Sheets-Sheet 1

INVENTOR.
CHARLES O. MEYERS
BY Arthur L. Wade
ATTORNEY

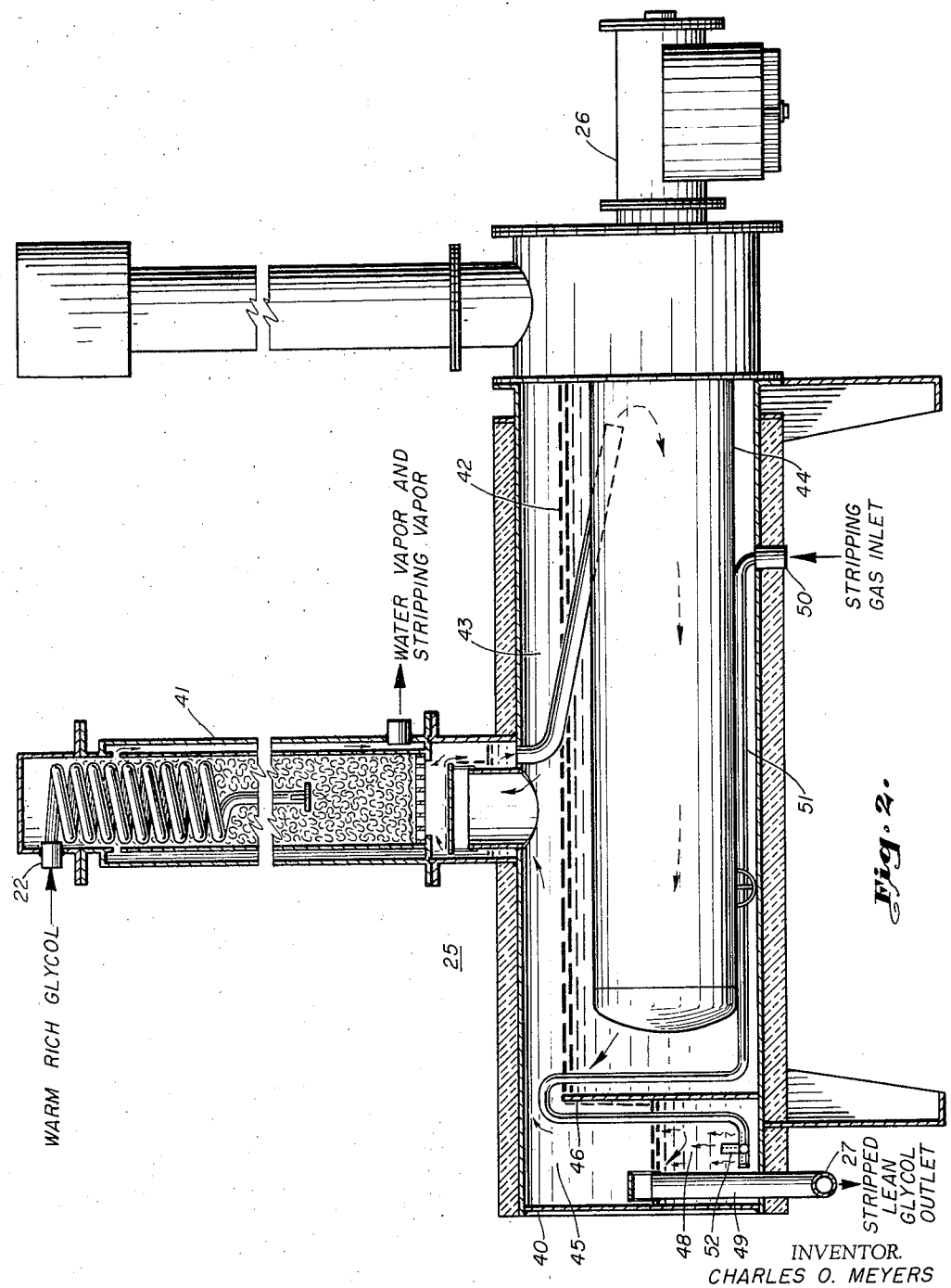

United States Patent Office 3,233,390
Patented Feb. 8, 1966

3,233,390
APPARATUS FOR RECONCENTRATING
LIQUID DESICCANT
Charles O. Meyers, Tulsa, Okla., assignor to National Tank Company, Tulsa, Okla., a corporation of Nevada
Filed Mar. 11, 1963, Ser. No. 264,217
2 Claims. (Cl. 55—196)

The present invention relates to a system for reconcentrating liquid desiccant with heat and a portion of the gas dehydrated by the desiccant. More specifically, the invention relates to a mechanical arrangement for first reconcentrating the liquid desiccant by heat and secondly applying the dehydrated gas to further concentrate the desiccant.

Liquid desiccants, such as the glycols, are quite useful in dehydrating natural gas streams. A contactor tower is normally provided in which liquid desiccant is brought into intimate contact with the natural gas stream to be dehydrated. The desiccant, enriched by the water, is removed from the gas stream and then reconcentrated by boiling off the water with heat. The desiccant is then recirculated through the contactor vessel in a continuous operation.

There is a limit to the temperature to which commercially available liquid desiccants may be heated to reconcentrate them. Above this limit, the liquid desiccant begins to deteriorate or breakdown chemically. Unfortunately, the upper temperature limit established by the danger of chemical decomposition of liquid desiccant does not permit all the water to be driven out of the desiccant by heat alone.

By heat alone, triethylene glycol can be reconcentrated to about 98.5% with the temperature level at 380° F. For many dehydration requirements, this degree of concentration is adequate. However, there are growing demands for higher concentrations, to obtain greater depressions of the dewpoint of gas streams. Another percent of reconcentration of the desiccant meets these growing demands.

Basically, to reduce the water content of liquid desiccant, the vapor equilibrium above the liquid phase must be shifted. If enough vapor, with low water content, is available, this shift can be carried out above the surface of a desiccant body of any size. The present invention enables a small part of the complete stream of natural gas dehydrated by the desiccant of the system to shift the vapor equilibrium above the surface of the desiccant. The desiccant, heat-reconcentrated, is thereby further reconcentrated.

One of the first problems to be solved by the present invention is how to simply, and economically, isolate a small collection of heat-reconcentrated liquid desiccant. Second there is the problem of applying a gas which is under-saturated with respect to water to the small collection of desiccant for shift of the vapor equilibrium above the desiccant with simplicity.

An object of the present invention is to obviate the need for a separate contacting vessel for a relatively small collection of heat-reconcentrated desiccant and gas with which to shift the vapor equilibrium above the desiccant.

Another object of the invention is to conduct the gas to the small collection of heat-reconcentrated desiccant with a simple piping arrangement.

The present invention contemplates provision of a relatively small compartment within the vessel in which heat-reconcentration of liquid desiccant is carried out. After heat-reconcentration of the desiccant, desiccant is flowed into the relatively small, separate compartment of the reconcentrator vessel for contact with a small portion of the dehydrated gas. Baffling which defines the relatively large heated portion of the reconcentrator and the relatively small portion of the reconcentrator, is arranged in such form as to readily provide for the conduit for the dehydrated gas portion to pass in heat exchange with the heated compartment of the reconcentrator and into the small compartment of the reconcentrator.

Other objects, advantages and features of this invention will become apparent to one skilled in the art upon consideration of the written specification, appended claims, and attached drawings, wherein;

FIG. 1 is a diagrammatic representation of a complete system employing the liquid desiccant to dehydrate a natural gas stream; and FIG. 2 is a section elevation of the desiccant reconcentrator and stripper vessel of FIG. 1 embodying the present invention.

*General system*

Referring to FIG. 1, there is shown a complete system for dehydrating a natural gas stream, using liquid desiccant, and embodying the present invention. As disclosed in FIG. 1, the various units of the system are shown in the conventional arrangement for bringing liquid desiccant into proper contact with the natural gas stream to be dehydrated and reconcentrating the liquid desiccant. The liquid desiccant is first heat-reconcentrated in the conventional manner and then further concentrated by the application of a portion of the dehydrated natural gas stream under the concepts of the present invention.

Contactor tower 10 is a good starting point for analyzing the complete system. The wet natural gas is brought to tower 10 through conduit 11 connected into a lower section of the tower. The internal arrangement of tower 10 is conventional, the dried gas being withdrawn from the top of the tower through conduit 12.

The lean desiccant, for drying the gas, is inserted into tower 10 through conduit 13. After contact with the gas, the desiccant forms a collection 14 in the bottom of tower 10. The wet desiccant is drawn off through conduit 15 for reconcentration. The level of collection 14 is sensed by a float 16 which exerts a control over valve 17 to maintain the level of collection 14 and prevent this level from lowering to outlet conduit 15.

The wet desiccant, withdrawn through conduit 15, passes through valve 17 and is heat exchanged with reconcentrated desiccant in vessel 20. Vessel 20 primarily functions as a surge chamber for the liquid desiccant and doubles as a heat exchanger between the reconcentrated and wet desiccant. Conduit 15 conducts the wet desiccant into heat exchange coil 21 which is in direct contact with the volume of reconcentrated desiccant within vessel 20. Conduit 22 then conducts the warm rich desiccant to the reconcentrating equipment.

The reconcentrating equipment for the rich desiccant of conduit 22 is generally indicated at 25. FIG. 2 shows the internal arrangement of this equipment to better advantage. In general, FIG. 1 indicates the warm rich desiccant inserted into the reflux column of the reconcentrator after which heat is applied by burner 26 for the first stage of reconcentration. The second stage of reconcentration, involving the present invention, also takes place within unit 25 and the lean desiccant produced is removed through conduit 27.

Conduit 27 takes the hot reconcentrated desiccant to vessel 20 where it is heat exchanged with the cool rich desiccant from the bottom of tower 10. Conduit 28 then directs the cooled lean desiccant through pump 29. This cycle is completed by the insertion of this cool lean glycol into tower 10 through conduit 13. Disclosed in this manner, the system for bringing liquid desiccant into contact with the natural gas stream to be dehydrated, and reconcentrating the desiccant, is conventional. The present invention utilizes a portion of the dry gas in conduit 12 in a second stage of reconcentration of desiccant within unit 25. Conduit 30 removes this portion of the dried gas stream. This portion of the dry gas stream is then used for several purposes, one of which is its use in the second stage of reconcentration.

Use of the dry gas

Assuming the dry natural gas stream in conduit 12 is at a pressure in the order of 800 lbs. per sq. in., regulator 31 reduces this pressure to the order of 90 lbs. per sq. in. conduit 32. Part of this gas at 90 lbs. per sq. in. can be used in conduit 33 for the pilot gas in the level control of valve 17. Pressure regulator 34 reduces the 90 lbs. per sq. in. gas to the order of 15 lbs. per sq. in. for use as pilot gas.

The gas in conduit 32 is also taken through a regulator 35 for reduction to a pressure level which will render it useful in burner 26. The amount of this gas from regulator 35 which is consumed in burner 26 is determined by valve 36 as controlled by a temperature unit 37 in the desiccant being heated within unit 25.

Finally, a regulated portion of the gas of conduit 32 is taken into unit 25 for the second stage of reconcentration. A regulator 38 reduces the 90 lbs. per sq. in. gas to 15 lbs. per sq. in. and a manual valve is set by a rotameter 39 to give the flow desired for the second stage of reconcentration. This specific application of this source of dry gas is more completely explained, under the concepts of the present invention, by the use of FIG. 2.

The reconcentrator and stripper

The sectioned elevation of FIG. 2 illustrates the reconcentrator 25 in most of its details. The unit is basically characterized by horizontally extended cylindrical vessel 40 with reflux column 41 mounted thereon. The operation of the reflux column is conventional and it is sufficient to generally indicate that the warm rich glycol is passed down this column and into vessel 40 to form a body 42 in a relatively large compartment of the vessel 40.

Vessel 40 is divided, essentially, into two compartments. The first compartment 43 is relatively large and receives the desiccant to be reconcentrated by heat around heater tube 44 mounted therein. Heater 44 is submerged in the body 42 of liquid desiccant and the heat from the tube boils off a large percentage of the water which the desiccant has absorbed from the natural gas stream in tower 10.

Triethylene glycol is presently a common liquid desiccant and is usually elevated to a temperature in the order of 380 deg. F. This level of heating reconcentrates the glycol to the order of 98.5%. Converting to mol percent, we have a liquid composition as follows:

|  | Mol percent |
|---|---|
| Triethylene glycol | 88.7 |
| Water | 11.3 |

This is the normal reconcentration of diluted triethylene glycol by heat alone. From available vapor-liquid equilibrium data for triethylene glycol, the vapor composition is then determined as approximately:

|  | Mol percent |
|---|---|
| Triethylene glycol | 15 |
| Water | 85 |

In any vapor, mol percentage is a volume percentage. So the vapor above the reconcentrated glycol is actually 85% water vapor. The present invention seeks to shift the vapor composition so as to reduce the partial pressure of water above the glycol. If this is done, liquid equilibrium will be shifted, and the water concentration in the liquid will be reduced. The present invention makes this desirable result possible in the second stage of reconcentration.

The small compartment

A baffle divides the internal volume of vessel 40 into relatively large compartment 43 and relatively small compartment 45. This baffle is specifically a weir 46 upstanding from the bottom of vessel 40. The heat-reconcentrated glycol of body 42 is flowed into compartment 45 to form the relatively small collection of this glycol at 48. The level of this collection 48 is maintained at a predetermined minimum by a spillover weir pipe 49. After the heat-reconcentrated glycol has been subjected to the second stage of reconcentration within compartment 45, it is removed through weir pipe 49 and conducted out of unit 25, reconcentrated to the order of 99.4 weight percent.

The principle utilized by the present invention to reduce the water content of heat-reconcentration desiccant is commonly referred to as "vapor-stripping." Essentially, the principle is employed when a gas which is under-saturated with respect to water vapor, is introduced into the vapor above heat-reconcentrated desiccant in quantities sufficient to shift the vapor composition above the desiccant enough to reduce the partial pressure of water above the desiccant. This principle is one well established in the art. However, I employ this principle in a unique manner when I isolate a small collection of the heat-reconcentrated desiccant in compartment 45. This isolation of small collection 48 then enables a relatively small portion of the dehydrated natural gas to be employed in effectively reducing the water content of the heat-reconcentrated desiccant.

Baffle 46

I have provided, from a mechanical standpoint, an economical structure for making the collection 48 available for vapor stripping. The simple expedient of baffle 46 both divides liquid body 42 from liquid body 48 while maintaining the level of body 42 in compartment 43. Baffle 46 acts as a weir, the heat-reconcentrated glycol spilling over the top of baffle 46 to form collection 48 in compartment 45. The level of glycol in compartment 43 is high enough to completely cover the heat source and thereby receive the heat which boils off the absorbed water. At the same time, baffle 46 is no barrier to the conduit for the part of the total gas dehydrated and which is used to shift the vapor equilibrium above the glycol.

Stripping gas

It is fundamental that the vapor above the surface of liquid collection 48 must be shifted in equilibrium relationship to reduce the water content of the glycol. Any gas which is under-saturated with respect to water will shift the equilibrium relationship. The gas dehydrated by column 10 is a convenient source for such gas.

Conduit 30 receives dehydrated gas at some high pressure, say in the order of 800 lbs. per sq. in. Part of this gas is reduced into conduit 32 to the order of 90 lbs. per sq. in. Part of this 90 lbs. per sq. in. gas is reduced through regulator 38 to a low value and conducted into shell 40 of reconcentrator 25 at 50. Conduit 51 extends along the bottom of shell 40, over baffle 46 and down to terminate in a spreader structure 52 near the bottom of compartment 45. The gas released through spreader 52 then bubbles to the surface of collection 48 to carry out its stripping function and exhaust through compartment 43 and reflux column 41. The total pressure of compartment 43 is maintained at substantially atmospheric pressure but the partial pressure of water vapor above the glycol is reduced.

At least two things are done with the stripping gas which must be appreciated. First, the gas is heated in compartment 43. Second, the gas is intimately contacted with the liquid of collection 48 to initiate the shift in vapor equilibrium.

When the gas is heated it becomes more under-saturated with respect to water vapor. The combination of conduit 51, hot glycol 42 and adjacent collection 48 makes it simple to utilize heat exchange to raise the temperature of the gas in conduit 51 and direct it into the collection of compartment 45. Conduit 51 simply connects into shell 40 at 50, extends along its bottom, loops over weir-baffle 46 and extends its spreader 52 well down into collection 48.

When released below the surface of collection 48, the under-saturated gas is dispersed through the liquids of collection 48. This mixing of gas and liquid enables the force of equilibrium unbalance to be effective in shifting for further removal of water from the glycol as it passes into collection 48 and over weir pipe 49 and out conduit 27.

The gas from conduit 51 is regulated to such quantity as to flow over baffle 46 and into the vapor of compartment 43.

The flow of vapor, which is undersaturated with respect to water vapor, carries water stripped from the thermally reconcentrated glycol into compartment 43 and discharges it up reflux column 41. The undersaturated condition of the vapor above the surface of the glycol is continuously maintained and the stripping of the glycol is therefore continuous in compartment 45.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A system for reconcentrating liquid desiccant including,
    a horizontally extended vessel,
    a weir-baffle mounted on the interior of the vessel and arranged to extend from the bottom of the vessel near one end of the vessel to near the top of the vessel to form a relatively large compartment and a relatively small compartment within the vessel interior,
    a heat source mounted through a wall of the vessel and extending into the relatively large compartment to heat desiccant to within a range close to the temperature at which desiccant deteriorates,
    an inlet conduit connected through the wall of the vessel and into the large compartment for bringing rich desiccant into the large compartment where the desiccant is heated and then flows over the weir-baffle and into the small compartment,
    a conduit connected to a supply of vapor which conduit enters through only one opening into the vessel and is extended only within the vessel along the bottom of the large compartment and up and over the weir-baffle and down to the lower portion of the small compartment, whereby the vapor is increased in under-saturation with respect to water vapor and released in the lower portion of the small compartment,
    means for maintaining a predetermined level of the desiccant in the small compartment above the termination of the vapor conduit,
    and an outlet conduit from the small compartment for the desiccant which has been thermally reconcentrated and subsequently stripped of additional water by the under-saturated vapor.

2. A system for dehydrating natural gas, including,
    a contactor tower,
    a conduit connected through the wall of the tower to introduce wet natural gas into a lower portion of the tower,
    a conduit connected through the wall of the tower to remove the natural gas from the upper portion of the tower,
    a conduit connected through the wall of the tower to introduce dry liquid desiccant into an upper portion of the tower so the desiccant will flow down the interior of the tower and remove water from the natural gas,
    a conduit connected through the wall of the tower to remove rich liquid desiccant from the lower portion of the tower,
    a horizontally extended vessel connected to the desiccant conduits to receive the rich desiccant from the contactor tower,
    a weir-baffle mounted on the interior of the vessel and arranged to extend from the bottom of the vessel near one end of the vessel to near the top of the vessel to form a relatively large compartment and a relatively small compartment within the vessel interior,
    a heat source mounted through a wall of the vessel and extending into the relatively large compartment to heat rich desiccant received from the contactor tower to within a range close to the temperature at which desiccant deteriorates,
    an inlet conduit connected through the wall of the vessel and into the large compartment for bringing rich desiccant into the large compartment where the desiccant is heated and then flows over the weir-baffle and into the small compartment,
    a conduit connected to the natural gas removed from the contactor tower and entering through only one opening into the horizontally extended vessel and extended only within the vessel along the bottom of the large compartment and up and over the weir-baffle and down to the lower portion of the small compartment, whereby the gas is increased in under-saturation with respect to water vapor and released in the lower portion of the small compartment,
    means for maintaining a predetermined level of the desiccant in the small compartment above the termination of the vapor conduit,
    and an outlet conduit from the small compartment for the desiccant which has been thermally reconcentrated and subsequently stripped of additional water by the under-saturated vapor, the outlet conduit connected to deliver the dry liquid desiccant to the contactor tower.

References Cited by the Examiner

UNITED STATES PATENTS 3,105,748   10/1963   Stahl _____ 55—32

REUBEN FRIEDMAN, *Primary Examiner.*